US005095607A

United States Patent [19]

Simon et al.

[11] Patent Number: 5,095,607

[45] Date of Patent: Mar. 17, 1992

[54] METHOD OF USING A TOOL FOR SECURING BAGHOUSE FILTERS

[75] Inventors: Ronald Simon; Conrad Baughman, both of Harpers Ferry, Iowa

[73] Assignee: Gencor Industries Inc., Orlando, Fla.

[21] Appl. No.: 610,953

[22] Filed: Nov. 9, 1990

[51] Int. Cl.[5] .......... B23P 19/04

[52] U.S. Cl. .......... 29/523; 29/525; 29/255

[58] Field of Search .......... 29/275, 254, 255, 525, 29/512, 523, 520

[56] References Cited

U.S. PATENT DOCUMENTS 2,339,258 1/1944 Engh .......... 29/255

3,769,682 11/1973 Carver .......... 29/255

3,945,104 3/1976 Brookover .......... 29/255

*Primary Examiner*—Robert C. Watson

*Attorney, Agent, or Firm*—Nixon & Vanderhye

[57] ABSTRACT

The tool includes a tool head having a tapered portion at one end for receipt within the flexible snap ring of a filter bag for expanding the snap ring into seating and sealing engagement about the margins of the opening in the tube sheet to secure the filter bag in depending relation from the tube sheet. The tool also includes a slidable member or weight along its handle whereby, in the event the tool becomes stuck in the opening, the weight can be displaced upwardly to impact against a tool surface and thus jar the tool loose from its engagement with the snap ring.

15 Claims, 1 Drawing Sheet

METHOD OF USING A TOOL FOR SECURING BAGHOUSE FILTERS

BACKGROUND AND SUMMARY OF THE INVENTION

The present invention generally relates to the application of filter bags to tube sheets in a baghouse and, more specifically, relates to a tool for facilitating securement of the filter bags in the tube sheet openings and methods for securing the filter bags in the openings.

Baghouses are typically employed for separating particulate-laden gases into solid particles and clean air. A typical example of the environment in which a baghouse is employed is in the asphalt industry wherein hot gases of combustion are employed to dry aggregate in a rotary drying drum. The dust and other particles from the aggregate are carried by the exhaust gases into the baghouse, where the particulate matter is filtered from the gases and the clean gas is vented to atmosphere. A conventional baghouse may comprise a large hopper into which the particulate-laden gases flow. A substantial number of filter bags depend from tube sheets located adjacent the upper end of the hopper, the bags depending into a dirty air chamber. The bags filter the particulate matter from the gas and the clean gas passes through the filter material into the bags and up through the openings in the tube sheets into a clean air chamber for discharge to the atmosphere. The solids separated from the particulate laden gases drop to the bottom of the hopper for removal. Baghouses may be portable or stationary and there may be anywhere from 300 to 1,000 bags in a typical baghouse.

The bags are essentially elongated socks open at their upper ends. Typically, they are formed to a diameter of about five to six and one-half inches and may depend from the tube sheets distances, for example from nine through sixteen feet. The throughput of a baghouse is dependent upon the aggregate area of the bags and that area may range from 5,000 square feet to 20,000 square feet. The filter bag material is conventionally a woven cloth.

It will be appreciated that, in this highly abrasive environment, the bags must be periodically replaced. Also, it is vitally important that, during the initial placement of each bag in the baghouse, as well as during its replacement, the bag seats in the tube sheet opening in a manner to ensure that the bag does not leak, i.e., provide a path other than through the filter material for communicating dirty air from the dirty air chamber into the clean air chamber above the tube sheet. Typically, the bags are secured to the tube sheets to depend therefrom by snap rings. Each ring is normally formed of a stainless steel inner ring having a band of felt material secured, for example, by adhesive, about the outer annular surface thereof. The felt material is rolled along upper and lower edges to define an annular groove therebetween for receiving the margins of the tube sheet defining the tube sheet opening. The margins of the bag adjacent its open end are preferably disposed along the outside surface of the snap ring, i.e., overlying the felt material, and are reverse-folded over the top of the ring for disposition along the inside surface thereof. The end margin of the bag is stitched to the body of the bag below the snap ring to retain the ring adjacent the bag opening. When the bag is secured to the tube sheet, the bag material overlying the felt band surrounding the inner ring engages within the annular groove defined by the felt band and the margins of the tube sheet. Consequently, with this arrangement, it will be seen that if the snap ring and bag are properly seated in the opening, there will be no leakage paths between the margins of the tube sheet defining the opening and the bag.

One of the problems, however, in installing a substantial number of bags of this type is to ensure that each bag is properly seated in the tube sheet opening to avoid any leakage between the dirty air and clean air chambers on opposite sides of the tube sheet. To install the bag, a workman typically stands on the tube sheet and collapses the snap ring such that it fits within the tube sheet opening. By releasing the ring, it snaps back or is forced to engage the margins of the tube sheet opening. However, with the bag material bunched or grouped about the ring, the bag may not properly seat against the tube sheet margins, leaving one or more openings between the snap ring and the tube sheet. Frequently, the workman will run a screwdriver around the interior of the ring in an effort to ensure proper seating and sealing to the margins of the opening. This method of seating of the upper end of the filter bag in the tube sheet, however, has not been completely satisfactory and leakages have occurred.

According to the present invention, there is provided a tool for ensuring proper seating and sealing of the snap ring and bag to the margins of the openings in the tube sheet whereby leakage paths are eliminated. The present invention also provides a method of facilitating securement of the bags in the tube sheets in a manner to ensure proper seating and sealing of the filter bags to the tube sheets. Particularly, the tool of the present invention comprises a handle, preferably an elongated shaft extending along the axis of the tool, and terminating at one end in a tool head. The head includes an annular tapered portion which tapers radially inwardly in a direction away from the tool handle. The tapered portion terminates in a diameter less than the internal diameter of the snap ring to facilitate insertion of the tool head within the snap ring and terminates at its opposite end in a diameter slightly larger than the diameter of the snap ring when engaged in the margins of the tube sheet opening. Preferably, the handle is secured to a plate which extends at right angles to the handle and from which plate the tapered annular portion projects. The tool also includes a member or sleeve slidable along the handle, preferably between the opposite ends of the tool. At the end of the handle opposite the tool head, there is provided an enlargement or stop for preventing the member or sleeve from being displaced from the handle. The stop also provides an impact surface for the member or sleeve which may be weighted. The sleeve is stopped at the opposite end by the tool head.

In using the tool hereof, the workman applies the open end of the filter bag with the snap ring to the margins of the tube sheet opening by collapsing a portion of the snap ring radially inwardly to enable it to fit within the opening. By releasing the snap ring, the workman may guide it such that the margins of the tube sheet opening lie in the annular groove along the outer surface of the felt band with the filter bag material therebetween. In order to ensure that the bag is properly seated and substantially sealed to the margin of the tube sheet opening, the workman may stand on the tube sheet and insert the annular tapered portion of the tool into the open snap ring. By pressing downwardly on the tool, the snap ring is urged uniformly radially outwardly such that the snap ring and filter bag material overlying its outer surface are seated in the opening, with the margins of the opening engaging in the groove of the felt band with the filter bag material therebetween.

In the event the tool has been pushed downwardly into the ring with such force that it is difficult to remove the tool, the weighted member or sleeve may be displaced upwardly with substantial force to impact against the tool surface at the opposite end thereof from the tool head. This impact will jar or loosen the tool head from its engagement with the snap ring, permitting the tool to be withdrawn. By performing a similar operation on each of the plurality of filter bags and snap rings, the tool ensures that the bags are properly seated and that there are no leakage paths between the dirty and clean air chambers.

In a preferred embodiment according to the present invention, there is provided a tool for seating the open end of filter bags in a tube sheet having an opening for receiving the margins of the filter bag and a flexible ring for securing the bag in the opening, the ring having a diameter substantially corresponding to the diameter of the opening, comprising an elongated handle having a generally annular tool head adjacent one end, the tool head having an annular tapered portion extending generally coaxial of the handle, the tapered portion having an outer surface tapering radially inwardly in a direction away from the handle for reception generally axially of and within the ring for urging the ring radially outwardly into seated engagement with the edges of the tube sheet opening, thereby seating the filter bag and ring in the tube sheet opening.

In a further preferred embodiment according to the present invention, there is provided a method for seating the open end of a filter bag in a tube sheet having an opening for receiving the margins of the filter bag and a flexible ring for securing the bag in the opening, the ring having a diameter substantially corresponding to the diameter of the opening, comprising the steps of disposing marginal portions of the bag adjacent the open end thereof in the opening at a location between the ring and the margins of the opening and engaging a tool having a tapered head within the ring to urge the ring radially outwardly into substantial sealing engagement in the tube sheet opening with the margins of the filter bag disposed between the ring and margins of the opening.

In a further preferred embodiment according to the present invention, there is provided a method for seating the open end of a filter bag in a tube sheet having an opening for receiving the margins of the filter bag and a ring for securing the bag in the opening, the ring having a diameter substantially corresponding to the diameter of the opening, comprising the steps of securing marginal portions of the bag adjacent the open end thereof to the ring, disposing the ring in the opening of the tube sheet and engaging a tool having a tapered head within the ring to urge the ring radially outwardly into substantial seating engagement with the margins of the tube sheet opening.

Accordingly, it is a primary object of the present invention to provide a novel and improved tool for seating and substantially sealing the filter bags of a baghouse in a tube sheet and a method of application of the filters to the tube sheet wherein the tool is simple, inexpensive, easily and readily utilized and yet is effective to ensure proper seating of the bag in the tube sheet without leakage.

These and further objects and advantages of the present invention will become more apparent upon reference to the following specification, appended claims and drawings.

BRIEF DESCRIPTION OF THE DRAWING FIGURES

DETAILED DESCRIPTION OF THE DRAWING FIGURES

Reference will now be made in detail to a present preferred embodiment of the invention, an example of which is illustrated in the accompanying drawings.

Figure 1:
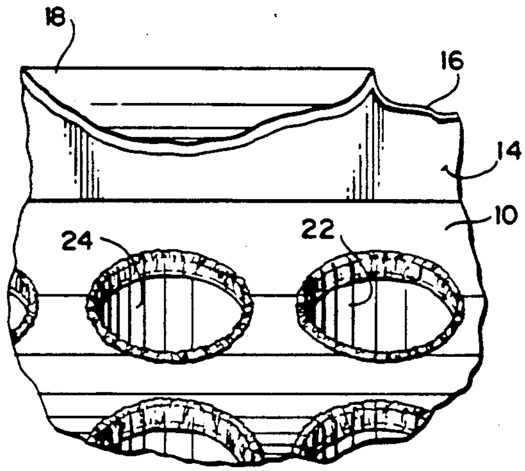
FIG. 1 is a fragmentary perspective view with parts in cross-section of a tube sheet illustrating the openings of the filter bags into the clean air plenum above the tube sheet.

Referring now to the drawings, particularly to FIG. 1, there is illustrated the tube sheet 10 of a baghouse, not shown. The tube sheet 10 comprises a horizontal sheet disposed adjacent the top of an elongated baghouse hopper and which divides the baghouse into a dirty air plenum or chamber 12 below tube sheet 10 and a clean air plenum or chamber 14 above tube sheet 10. The dirty air chamber 12 is defined by tube sheet 10 at the top and by hopper side, end and bottom walls, not shown. The clean air chamber 14 is defined by top, side and end walls and tube sheet 10, only portions of a side wall 16, a top wall 18 and tube sheet 10 being illustrated in FIG. 1. The clean air chamber 14 has a clean air discharge, not shown. Tube sheet 10 is provided with a plurality of openings 20 normally arranged in longitudinally and transversely spaced rows, the tube sheet extending substantially the entire length and width of the hopper defining the baghouse. Openings 20 are, as illustrated, circular in configuration. Each opening is provided with a depending filter bag 22. Essentially, the filter bag is formed of a woven material in the form of an elongated sock which is open only at its upper end, e.g., see the openings 24 in FIG. 1. Thus, each filter bag 22 depends from tube sheet 10 into the dirty air chamber 12 below tube sheet 10 and serves to filter the particles of particulate-laden gas flowing from the dirty air chamber 12 of the baghouse into the clean air chamber 14. Particularly, the bags filter the particles such that the particles drop in the dirty air chamber 12 to the bottom of the hopper and the clean gas passes through the filter material into the depending filter bags for egress from the bags through openings 24 into clean air chamber 14 for discharge to the atmosphere.

Figure 2:
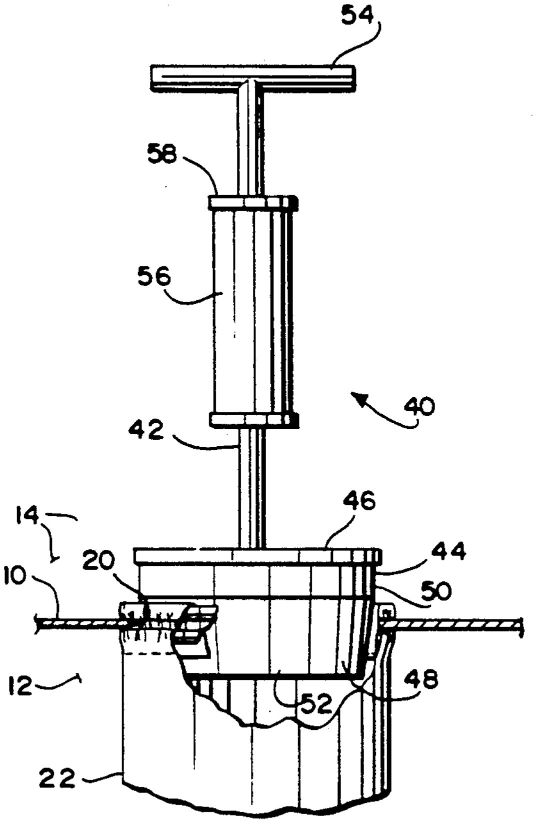
FIG. 2 is an enlarged fragmentary vertical cross-sectional view of the tool according to the present invention inserted into the filter bag opening.
Figure 3:
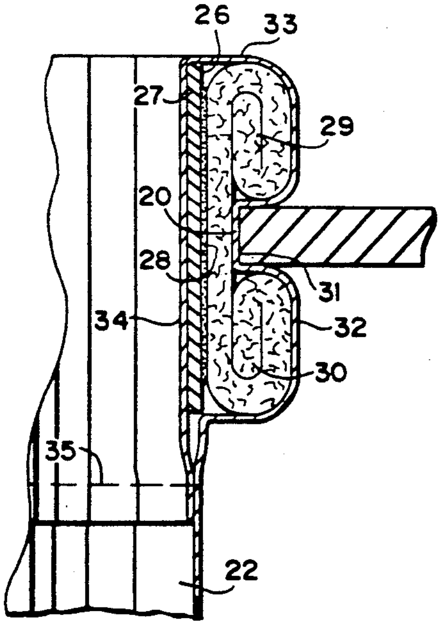
FIG. 3 is an enlarged fragmentary cross-sectional view illustrating the cooperation between the snap ring, margins of the filter bag and margins of the tube sheet opening.

Referring now to FIGS. 2 and 3, there is provided a flexible snap ring 26 for securing each depending bag 22 to the margins of the opening 20 in tube sheet 10. The snap ring 26 comprises an annular inner ring 27, preferably formed of stainless steel and an annular felt band 28 secured along the outer surface of inner ring 27 by a suitable adhesive. The felt band is rolled at its upper and lower edges 29 and 30, respectively, to define an annular groove 31 formed in and about its outer surface medially between its rolled upper and lower annular edges. Snap ring 26 is sufficiently flexible such that a workman, when installing the bags in the baghouse, may flex the snap ring inwardly in order to locate it within the opening 20. As best illustrated in FIG. 3, the margins of the bag material pass upwardly along the outside surface of the snap ring 26 as indicated at 32, are reversely folded over the top of the ring 26, as indicated at 33, and extend downwardly along the inside surface of the inner ring 28, as indicated at 33. The downwardly directed edges of each bag are secured, preferably by stitching 35, to the body portion of the bag just below snap ring 26. Thus, when the bags are properly seated in the tube sheet openings, the annular groove 31 of each snap ring 26 receives the marginal portion of the opening 20 with the outer portion 32 of the filter bag disposed therebetween and in groove 31. It will be appreciated that the material of the filter, when disposed about snap ring 26, may gather or otherwise interfere with proper seating of the bag in the opening. To alleviate that problem and to ensure that the upper end of the bag is properly seated in each tube sheet opening in a manner to avoid leakage paths between the dirty and clean air chambers 12 and 14, respectively, there is provided a tool, generally designated 40, for properly seating the bags in the tube sheet openings.

Tool 40 includes a handle 42, preferably an elongated, centrally disposed shaft, mounting a tool head 44 adjacent one end. Preferably, tool head 44 includes a flat plate 46 suitably secured to handle 42, for example, by welding and, from the opposite side of which, projects an annulus 48 which includes cylindrical and tapered portions 50 and 52, respectively. Cylindrical portion 50 has a diameter slightly in excess of the inside diameter of snap ring 26 such that the cylindrical portion 50 will not pass within the snap ring. Tapered portion 52 tapers radially inwardly in a direction away from the handle 42 and terminates at an end in a diameter less than the internal diameter of the snap ring 26, thereby enabling the tapered portion 52 to be inserted within snap ring 26. Annulus 48 may be solid, but is preferably a tubular piece having the outside taper 52 along a portion of its length. The tubular piece may be secured to plate 46, for example, by welding.

The opposite end of the handle 42 includes a radially enlarged piece 54 which serves as an impact surface, as described hereinafter. The piece 54 may comprise a bar secured, for example, by welding, to the end of handle 42. Alternatively, the end of handle 42 may be threaded to receive a washer and a lock nut, the latter serving as the impact surface.

Slidably disposed along handle 42 is a sleeve or member 56. Member 56 constitutes a tubular sleeve having end surfaces 58. Sleeve 56 may be weighted, if desired. It will be appreciated from a review of FIG. 2 that member 56 is slidable along handle 42 between the handle end piece 54 and head 44.

To install the filter bags in accordance with the present invention, the workman deflects the annular snap ring 26 and bag material thereabout radially inwardly to dispose the snap ring within the opening 20. Once positioned, the ring snaps back or is forced to snap back into its circular configuration and the annular groove 31 receives the marginal portions of the openings with the outermost bag material 32 therebetween.

In order to ensure proper seating without leakage paths, the tool is then used to ensure that the snap ring has fully expanded to seat against the margins of the opening 20. To accomplish this, the tapered portion 52 of the tool is disposed within the snap ring 26 and pressed downwardly. By pressing downwardly, the entire circumference of the snap ring is urged radially outwardly such that the annular groove receives the full peripheral extent of the margins of the tube sheet about opening 20. In this manner, the sealing engagement of the snap ring or the upper end of the filter bag is ensured.

In the event the tool becomes stuck in the snap ring, because of the downward pressure exerted on it to ensure proper seating, the slidable member or weight 56 may be displaced upwardly along handle 42 to impact against the surface 54. By impacting against that surface, the tool will be jarred loose from its engagement within the snap ring. The slidable member 56 may also be used to engage the tool in the opening by displacing it downwardly with considerable force.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for seating the open end of a filter bag in a tube sheet having an opening for receiving the margins of the filter bag and a flexible ring for securing the bag in the opening, the ring having a diameter substantially corresponding to the diameter of the opening, comprising the steps of:

disposing marginal portions of the bag adjacent the open end thereof in said opening at a location between the flexible ring and the margins of the opening; and engaging a tool having a tapered head within said ring to urge the ring radially outwardly into substantially sealing engagement in said tube sheet opening with the margins of the filter bag disposed between the flexible ring and margins of the opening.

2. A method according to claim 1 including the steps of deflecting at least a portion of the flexible ring radially inwardly to enable the flexible ring and marginal filter bag portions to be disposed in the opening and urging the deflected portion of the flexible ring radially outwardly into substantial sealing engagement with the tube sheet opening.

3. A method according to claim 1 including engaging the tool within the flexible ring from the open end of the filter bag.

4. A method according to claim 1 including sliding a weight along the tool and impacting the weight against a tool surface to facilitate freeing the tool from within the flexible ring in the event the tool becomes stuck in the opening.

5. A method according to claim 1 including sliding a weight along the tool and impacting the weight against a tool surface to facilitate engagement of the tool within the flexible ring.

6. A method according to claim 1 wherein the tube sheet has a plurality of openings for receiving respective filter bags and a flexible ring for securing each filter bag in each opening, including the steps of disposing the marginal portions of each bag adjacent its open end in a corresponding opening of the tube sheet at a location between its flexible ring and the margins of the opening and engaging a tool having a tapered head within each of the rings to urge the rings radially outwardly into substantial sealing engagement in the corresponding tube sheet opening with the margins of the filter bag disposed between the ring and the margins of the tube sheet opening.

7. A method according to claim 6 including the steps of deflecting at least a portion of the flexible ring radially inwardly to enable the band and marginal filter bag portions to be disposed in the opening and urging the deflected portion of the ring radially outwardly into substantial sealing engagement with the tube sheet opening.

8. A method according to claim 6 wherein the margin of the filter bag extends upwardly about outer portions of the flexible ring and is reverse-folded to extend downwardly along the inside of the flexible ring, wherein the step of disposing includes disposing the reverse-folded portion of each filter bag between the corresponding flexible ring and the margins of the corresponding tube sheet opening.

9. A method according to claim 8 including sliding a weight along the tool and impacting the weight against a tool surface to facilitate freeing the tool from within the flexible ring in the event the tool becomes stuck in the opening.

10. A method according to claim 8 including sliding a weight along the tool and impacting the weight against a tool surface to facilitate engagement of the tool within the flexible ring.

11. A method according to claim 8 including the steps of deflecting at least a portion of the ring radially inwardly to enable the ring and marginal filter bag portions to be disposed in the opening and urging the deflected portion of the ring radially outwardly into substantial sealing engagement with the tube sheet opening.

12. A method for seating the open end of a filter bag in a tube sheet having an opening for receiving the margins of the filter bag and a ring for securing the bag in the opening, the ring having a diameter substantially corresponding to the diameter of the opening, comprising the steps of:

securing marginal portions of the bag adjacent the open end thereof to the ring;

disposing the ring in the opening of the tube sheet; and engaging a tool having a tapered head within said ring to urge the ring radially outwardly into substantial seating engagement with the margins of said tube sheet opening.

13. A method according to claim 12 wherein the ring is flexible, and including the steps of deflecting at least a portion of the ring radially inwardly to enable the ring and marginal filter bag portions to be disposed in the opening and urging the deflected portion of the ring radially outwardly into substantial substantial seating engagement with the tube sheet opening.

14. A method according to claim 12 including sliding a weight along the tool and impacting the weight against a tool surface to facilitate freeing the tool from within the ring in the event the tool becomes stuck in the opening.

15. A method according to claim 12 wherein the tube sheet has a plurality of openings for receiving respective filter bags and a ring for securing each filter bag in each opening, including the steps of securing marginal portions of each bag adjacent its open end to the ring, disposing each ring in a corresponding opening of the tube sheet and engaging a tool having a tapered head within each of said rings to urge the rings radially outwardly into substantial seating engagement in the corresponding tube sheet opening.

* * * * *